March 17, 1970    F. C. BOYCE    3,501,198
SEAT ADJUSTING ARRANGEMENTS
Filed Aug. 8, 1967    6 Sheets-Sheet 1

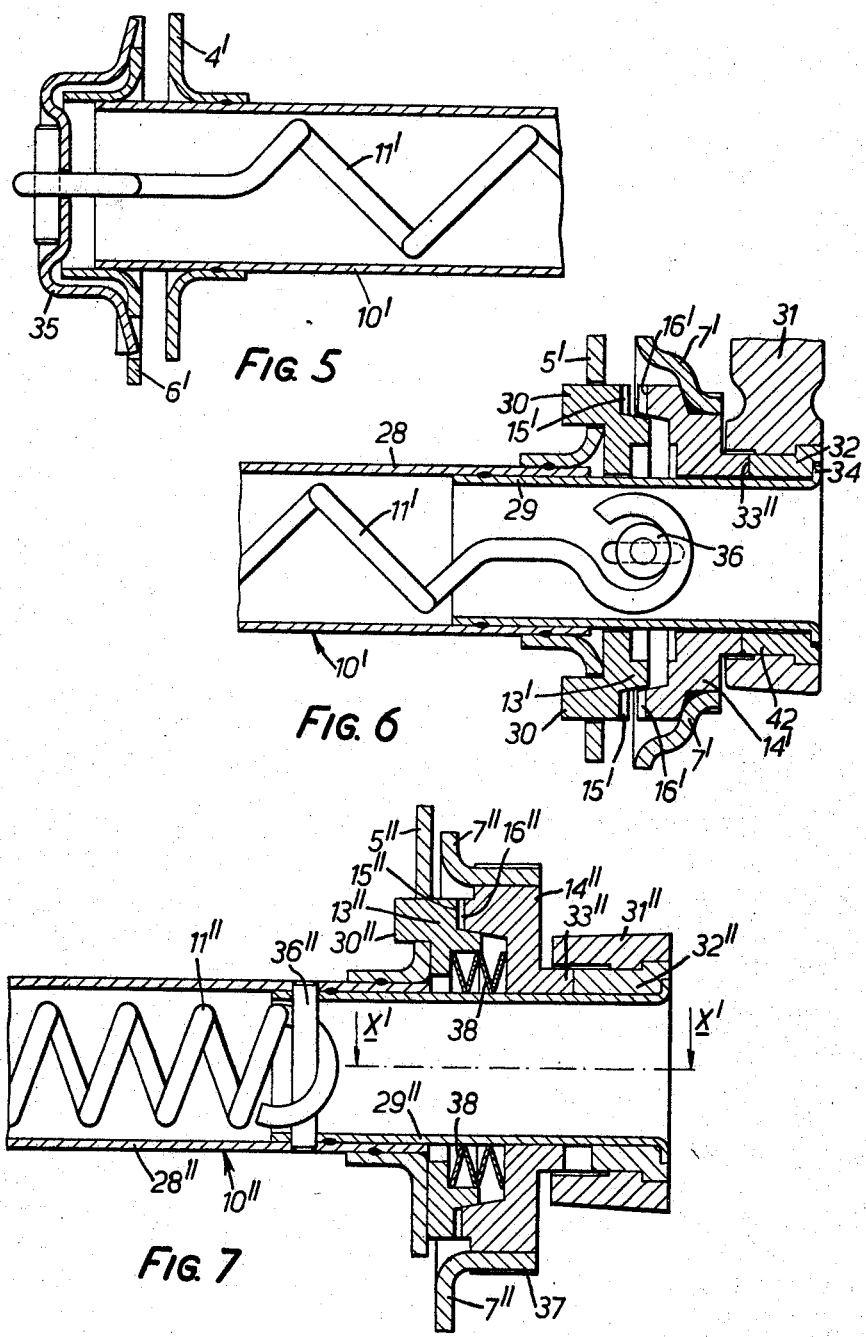

3,501,198
SEAT ADJUSTING ARRANGEMENTS
Frederick C. Boyce, Ilford, England, assignor to The Plessey Company Limited, Ilford, England, a British company
Filed Aug. 8, 1967, Ser. No. 659,116
Claims priority, application Great Britain, Sept. 28, 1966, 43,449/66; June 28, 1967, Ser. No. 29,920/67
Int. Cl. B60n 1/06
U.S. Cl. 297—373                    18 Claims

ABSTRACT OF THE DISCLOSURE

An adjustable seat arrangement for providing angular adjustment of the back of a seat relatively to the base structure thereof attached to the floor of a road vehicle say, the arrangement comprising an elongate cross member to which the back frame structure is fixedly attached and which is pivotally coupled to said base structure so as to constitute a hinge member enabling said angular adjustment, back locking means located adjacent one end of said cross member and comprising two toothed locking members one of which is coupled to said cross member and the other of which is coupled to said base structure, and an actautor including means effective when actuated to slide one of said toothed locking members relatively to the other toothed locking member, the arrangement being such that in one position of said cam means the teeth of the two locking members are in engagement with one another to preclude pivotal movement of said cross member with respect to said base structure, whilst in another position of said means the teeth of the two locking members are disengaged from one another to permit said pivotal movement.

---

Figure 1:
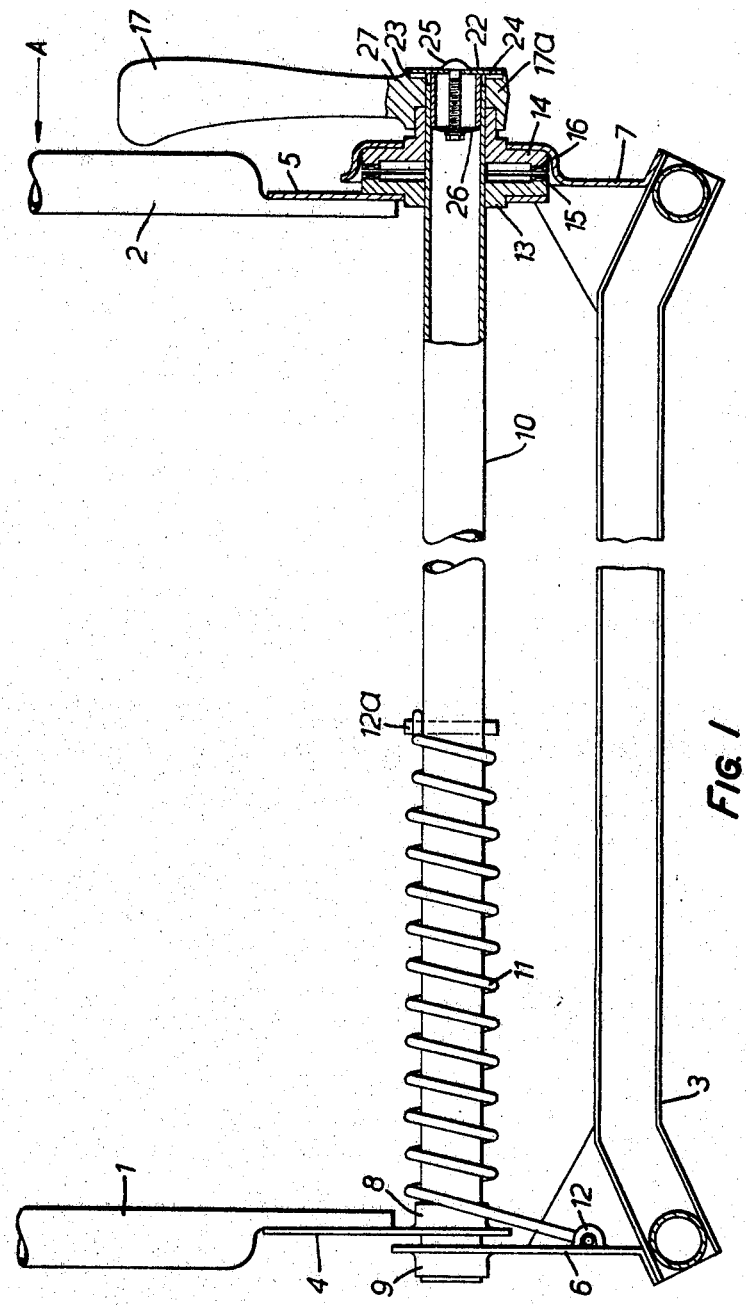

This invention relates to seat adjusting arrangements, more specifically to arrangements for providing angular adjustment of the back of a seat relatively to the base structure thereof. The invention is especially, although not exclusively, applicable to such arrangement for adjusting the backs of seats in vehicles.

According to the invention there is provided an arrangement for providing angular adjustment of the back of a seat relatively to the base structure thereof, comprising an elongated cross member to which the back frame structure is fixedly attached and which is pivotally coupled to said base structure so as to constitute a hinge member enabling said angular adjustment, back locking means located adjacent one end of said cross member and comprising two toothed locking members one of which is coupled to said cross member and the other of which is coupled to said base structure, and an actuator including means effective when actuated to slide one of said toothed locking members relatively to the other toothed locking member, the arrangement being such that in one position of said cam means the teeth of the two locking members are in engagement with one another to preclude pivotal movement of said cross member with respect to said base structure, whilst in another position of said cam means the teeth of the two locking members are disengaged from one another to permit said pivotal movement.

The two toothed locked members preferably comprise two coaxially mounted members with respect to the cross member having inter-engageable male and female parts of conical configuration with generally axially extending teeth the angle of inclination of which to the axis of the locking members in any axial plane thereof being greater than the jamming angle but less than the angle at which the locking members separate under purely circumferential loading. The two locking members preferably afford a double cone toothed locking arrangement thereby increasing substantially (e.g. doubling) the number of teeth which are available for bearing the total circumferential load or torque when the two locking members are inter-engaged.

Alternatively the two toothed locking members may comprise annular members mounted coaxially with said cross member with the teeth of said locking members being formed on facing radial surfaces thereof.

In carrying out the invention spring means may be provided biasing the back frame structure forwardly with respect to the base structure of the seat, and in order to adjust the back frame position the actuator is actuated to disengage the teeth of the two locking members, whereupon the back of the seat can be adjusted to a desired angular position against or whilst restraining the biasing spring force. When the required angular position of the seat back is reached the actuator is again actuated to lock the seat back in this position by engaging the teeth of the two toothed locking members.

Spring means may also be provided biasing the two toothed locking members to their disengaged position, and in one embodiment one coil spring may be employed to bias the back structure forwardly and to bias said toothed locking members to their disengaged position.

Preferably the actuator comprises a rotatable member, which may be a lever, pivotally mounted on the cross member and coupled to one toothed locking member, the arrangement being such that on pivoting said rotatable member, the cam means causes said rotatable member to be displaced in the lengthwise direction of said cross member, whereby said one toothed locking member is likewise displaced. The rotatable member may either be coupled to the toothed locking member coupled to said cross member, in which case said cross member is mounted for slidable movement with respect to said base structure, or the rotatable member may be coupled to the toothed locking member coupled to said base structure in which case the cross member is fixedly coupled to said base structure in its lengthwise direction and the respective toothed locking member is slidably coupled to said base structure. The actuator may be spring biased to a normal position so that the actuator will be rotated against the action of the spring.

In the event that the rotatable member is coupled to that toothed locking member which is coupled to the cross member, the coupling can be effected by means of a bowed plate rotatably coupled to said rotatable member and disposed within said cross member, which plate is partially flattened forceably to cause its periphery to bite into the material of said cross member. Alternatively the cross member may be coupled to said actuator via an annular flange projecting outwardly at the end of said cross member.

The cam means may comprise a cam surface and a cam follower, one of which is coupled to said rotatable member and the other of which is formed integrally with the toothed locking member coupled to said base structure. By way of example the cam surface may be formed integrally with said rotatable member and the cam follower may comprise a projection in a boss of said toothed locking member coupled to said base structure. Alternatively the came surface may be formed integrally with said toothed locking member and the cam follower may be coupled to said rotatable member.

The cross member is preferably a tubular member and a coil spring for biasing the back frame structure forwardly, or for biasing said back frame structure forwardly and biasing said two toothed locking members to their disengaged position may be provided surrounding or within said tubular cross member.

In order that the invention may be clearly understood and readily carried into effect it will now be more fully described with reference to specific embodiments thereof as illustrated in the accompanying drawings, in which:

FIGURE 1 is an elevation, partly in section, of a part of a seat frame structure of a vehicle including an arrangement for providing angular adjustment of the back of the seat relatively to the base structure thereof according to one embodiment of the invention.

Figure 2:
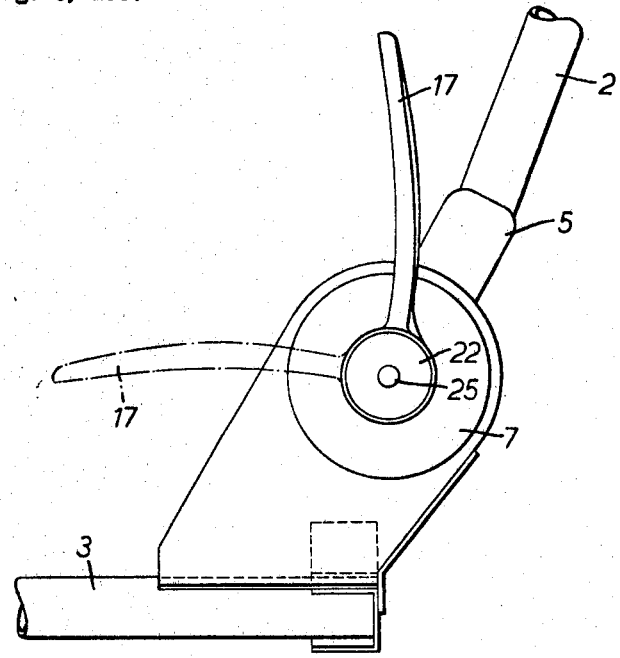
Figure 3:
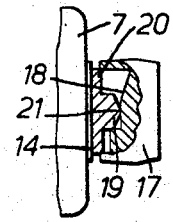
Figure 4:
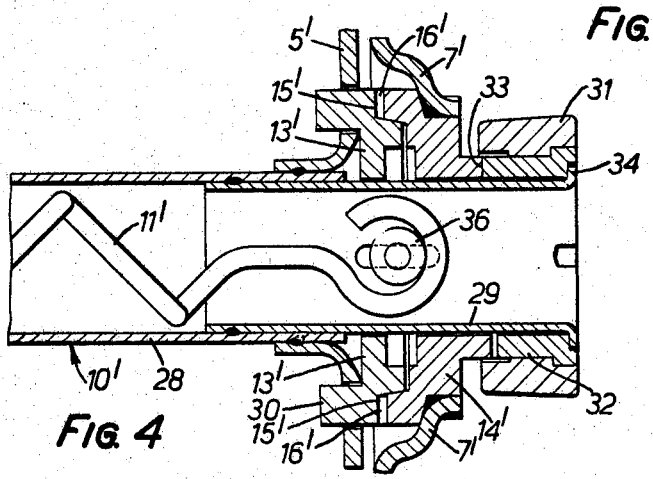
Figure 8:
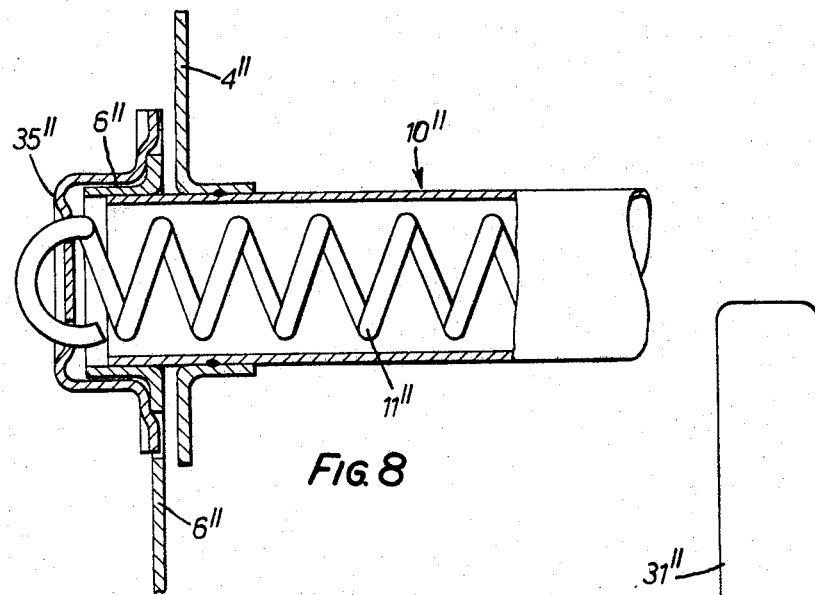
Figure 9:
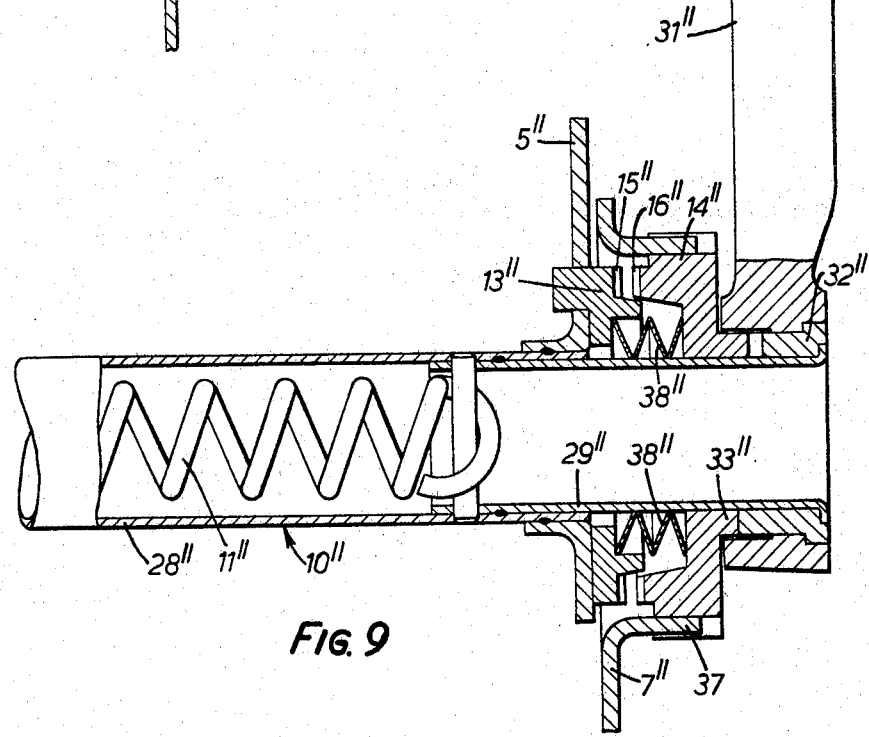
Figure 10:
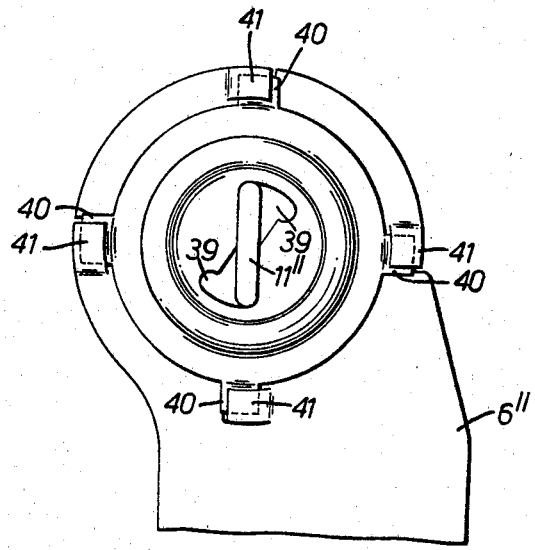
Figure 11:
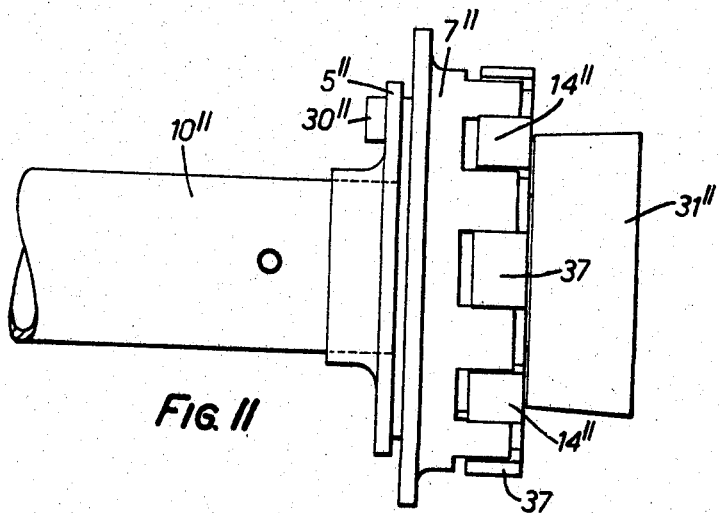
Figure 12:
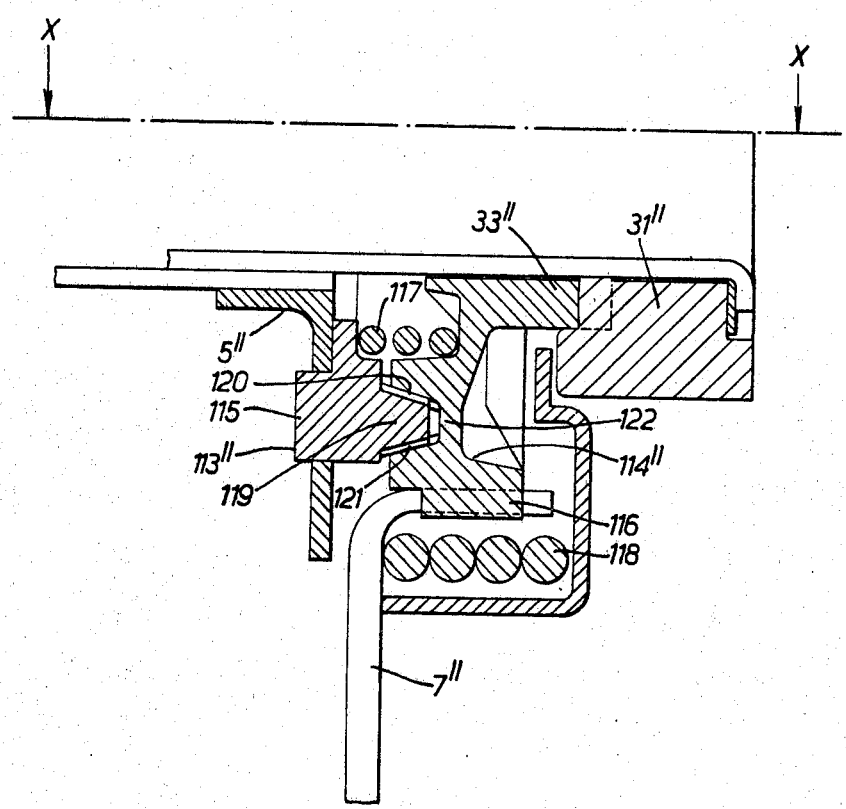

FIGURE 2 is a fragmentary end elevation in the direction A of the arrangement of FIGURE 1, FIGURE 3 shows, partly cut away a detail of the arrangement of FIGURES 1 and 2, FIGURES 4 and 5 are fragmentary sectional views, on an enlarged scale, of two ends of a seat back adjusting arrangement according to another embodiment of the invention in a locked condition, FIGURE 6 is a view corresponding to FIGURE 4 but showing the arrangement in an unlocked position enabling angular adjustment of the seat back, FIGURES 7 and 8 are fragmentary sectional views on the same scale as FIGURES 4 and 5, of two ends of a seat back adjusting arrangement according to yet another embodiment of the invention, in a locked condition, FIGURE 9 is a view corresponding to FIGURE 7 but showing the arrangement in an unlocked position enabling angular adjustment of the seat back, FIGURE 10 is an end elevation of FIGURE 8, FIGURE 11 is a side elevation of part of FIGURE 7, and FIGURE 12 is a half sectional view of an alternative locking arrangement.

The invention will be described with reference to the accompanying drawings as applied to arrangement for providing angular adjustment of the backs of seats in vehicles, such as car, in which the base structure of the seat is secured to the floor of the vehicle. The invention may, however, alternatively be applied to arrangements for providing angular adjustment of the backs of other types of seats with respect to the seat bases.

Reference will first be made to the embodiments of FIGURES 1, 2 and 3. As can be seen in FIGURE 1, a seat frame structure comprises a back frame structure which includes two tubular steel side members 1 and 2, and a seat base structure a part of which is indicated at 3.

The side members 1 and 2 have respective plate members 4 and 5 fixedly attached to them as by welding whilst the base structure 3 has secured to it plate members 6 and 7 adjacent its respective ends. As will be clear from FIGURE 1, the plate members 4 and 6 at the left-hand end of the seat frame structure, have tubular parts 8 and 9 respectively, which receive a tubular hinge cross member 10. The cross member 10 is free to rotate in the tubular part 9 to move lengthwise of said member 10, the tubular part 9 thus affording a bearing support for the member 10. The member 10, is, however, fixedly secured to the tubular part 8 of the plate member 4. At the right-hand end of the seat frame structure the plate member 5 is fixedly secured to the tubular cross member 10 through part of back locking means to be described in detail below, whilst plate member 7 has another part of the locking means secured to it, with respect to which the cross member 10 can be rotated and moved longitudinally.

Thus it will be seen that the seat back frame can be pivoted about the axis of the tubular cross member 10 by rotation of the said member 10 with respect to the plate member 6 and the part of the locking means secured to the plate member 7.

The tubular cross member 10 is embraced by a steel coil spring 11 which is anchored at one end at 11 on the plate 6 and which is anchored at its other end on a pin 12a passing through the tubular cross member 10. The coil spring 11 is pre-loaded and the two turns at the right-hand end of the spring 11 are preferably made of smaller diameter than the remainder of the turns as shown, so that during pre-loading of the spring 11 the right-hand end turns of the spring 11 bind on the tubular cross member 10 so as to reduce the spring force applied to the anchor pin 12a.

The coil spring 11 acts to bias the tubular cross member 10 to the left as viewed in FIGURE 1 whilst it also exerts a turning force on the said member 10 tending to urge the seat back frame structure to the forward position at which it is located on top of the seat base structure.

The locking means for locking the seat back frame structure in any desired position comprises two toothed annular locking members 13 and 14 which may for example be made of sintered iron/copper alloy. The locking members 13 and 14 are mounted coaxially with the cross member 10 and the locking member 13 has teeth 15 around the periphery of a radial surface which faces the locking member 14. The locking member 13 is fixedly secured, as by pressing to the plate member 5 and to the tubular cross member 10, as by welding. The locking member 14 is fixed, as by welding, to the plate member 7, and thus to the base structure 3. The locking member 14 also has teeth 16 on a radial surface facing the teeth 15 on the locking member 13. The tubular cross member 10 is rotatable and slidable within the locking member 14 which serves as a bearing support for cross member 10.

The right-hand end of the tubular cross member 10, as seen in FIGURE 1, is coupled to an actuator which comprises a rotatable member including a lever which is integral with a hub 17a pivotally mounted on the cross member 10 but coupled thereto for movement lengthwise of said cross member 10 in a manner which will be described hereinafter. The hub 17a has a cam surface 18 which can be seen in FIGURE 3, and which cooperates with a cam follower in the form of a projection 19 from a boss 20 of the locking member 14. The lever 17 and hub 17a may be a die casting and the cam surface 18 has a pair of indentations 21, only one of which is visible in FIGURE 3, and which are spaced apart by 90°. The indentations are engageable by the tip of the projection 19 and correspond to two limiting positions of the rotatable member, in one of which the seat back frame structure is locked and in the other of which said structure is free to pivot about the axis of the cross member 10. In FIGURE 2 the lever 17 is shown in full lines in the unlocked position and in dot-dash lines in the locked position.

The coupling between the rotatable member and the cross member 10 comprises a circular plate 22 which is rotatably housed within a recess 23 in the hub 17a via the intermediary of a spring washer 24, which may for example be of Phosphor bronze. A screw 25 passes through the plate 22, projects within the cross member 10, and engages in a threaded aperture in bowed spring steel plate 26 which is maintained in spaced relationship with the plate 22 by means of a tubular spacer 27 disposed within the cross member 10. The screw 25 is tightened to partially flatten forcibly the spring steel plate 26 to cause its periphery to bite into the material of the cross member 10 thereby locking the plate 22 with respect to the cross member 10. In this way the cross member is coupled to the rotatable member for movement lengthwise of said cross member 10 but the rotatable member can pivot about said cross member 10 by virtue of the pivotal mounting of the plate 22 in the recess 23.

In operation of the arrangement assuming that the lever is in its locked position initially, i.e. horizontal as viewed in FIGURE 2, in this position the projection 19 is engaged in the indentation 21 visible in FIGURE 3, i.e. at the top of the cam surface 18. This is the position shown in FIGURE 3, and in this position the projection 19 is urging the rotatable member, and hence the cross member 10 to their extreme right hand positions as viewed in FIGURE 1. Thus the cross member 10 is held against the longitudinal bias of the coil spring 11 and the locking member 13 is also constrained to the right as seen in FIGURE 1 and so its teeth 15 are held in engagement with the teeth 16 of the locking member 14. Thus rotation of the cross member 10 with respect to the locking member 14 is precluded and the seat back frame structure is accordingly locked in position. When it is required to adjust the angular position of said seat back frame structure the lever 17 is pivoted through 90° to the vertical position as shown in FIGURE 2. In so doing the projection 19 rides down the cam surface 18 and finally engages in the other indentation 21 (not shown) at the bottom of said cam surface. As the projection 19 rides down the cam surface 18, the longitudinal bias of the coil spring 11 acting on the cross member 10 and through the plate 22 on the hub 17a urges said cross member 20 and hub 17a towards the left as viewed in FIGURE 1, thereby displacing the locking member 13 until the teeth 15 are disengaged from the teeth 16 of the locking member 14. The cross member 10 is now free to pivot with respect to the base structure of the seat, and accordingly the back frame structure can be adjusted in position against or whilst restraining the torsional bias of the coil spring 11. When the seat base has been moved to a desired position the lever 17 is returned to its locked position to lock said seat back in its adjusted position.

In the embodiment of FIGURES 4, 5 and 6 components which correspond to those of the embodiment of FIGURES 1, 2 and 3 already described are given the same reference numerals with the appendix '. In FIGURES 4 and 5 there are shown respectively the two ends of a cross member 10' which is a tubular member similar to the cross member 10. In FIGURES 4, 5 and 6 the side members of the back frame structure are not shown but these are coupled to respective plate members 4' and 5' as in the embodiment already described. Likewise the seat base structure is not shown, but this is coupled at its left and right hand ends to plate members 6' and 7' respectively.

At the left-hand end of the cross member 10', shown in FIGURE 5, said cross member 10' is fixedly secured to the plate member 4', as by welding and is rotatably and slidably mounted with respect to the plate member 6'. As can be seen in FIGURE 4 the cross member 10' in this embodiment comprises a main tubular member 28 to which is secured at its right-hand end a short tubular sleeve 29, as by welding. The sleeve 29 is coaxial with the main tubular member 28 and partly fits within said member 28 and partly projects from the right-hand end thereof. The right-hand end of the main tubular member 28 is secured as by welding, to the plate member 5' and surrounding tubular sleeve 29 are two annular locking members 13' and 14' respectively provided with teeth 15' and 16' on facing radial surfaces thereof. The locking member 13' is coupled to the cross member 10' for rotational movement by means of a plurality of spaced studs or projections 30 provided around the locking member 13' and engaged in corresponding apertures in the plate member 5'. The other locking member 14' is fixedly secured, as by welding, to the plate 7', which in this embodiment is of dished configuration as shown, and the cross member 10' is mounted for rotation and sliding movement with respect to said locking member 14' the inner periphery of said locking member 14' serving as a bearing support for the tubular sleeve 29.

The actuator in this embodiment comprises a rotatable member 31 which is mounted for pivotal movement about the end of the short tubular sleeve 29 and may, for example, comprise a hub integral with a lever as in the embodiment of FIGURES 1, 2 and 3. The rotatable member 31 is coupled to a cam follower 32 which engages with a multi-lobed cam surface 33 provided on the loading member 14' as shown. The cross member 10' is coupled to the rotatable member for lengthwise movement by means of an annular flange 34 projecting outwardly from the end of the short tubular sleeve 29.

The cross member 10' is biased by a coil spring 11' which in this embodiment is disposed within the tubular cross member 10'. At its left-hand end the coil spring 11' is anchored to a cup-shaped end plate 35 (FIGURE 5) which engages with the plate member 6' as shown, whilst the other end of said coil spring is anchored on a pin 36 which passes through elongated slots in the short tubular sleeve 29 (FIGURE 4), the pin 36 also engaging with the locking member 13'. The coil spring 11' biases the cross member 10' and the locking member 13' longitudinally to the left as seen in the drawing thus holding the locking member 13' in engagement with the plate member 5'. In addition the coil spring 11' is preferably also arranged to bias the cross member 10' torsionally in a sense to tend to move the seat back forwardly with respect to the base structure, as in the previously described embodiment.

Operation of the arrangement shown in FIGURES 4, 5 and 6 is similar to that of the embodiment of FIGURES 1, 2 and 3. Thus assuming that initially the seat back frame structure is locked in position the locking means will be in the condition shown in FIGURE 4 in which the teeth 15' and 16' are in engagement with each other. Since the locking members 13' and 14' are respectively coupled to plate members 5' and 7' the cross member 10' is precluded from pivoting in this condition. In order to adjust the angular position of the seat back by pivoting said cross member 10' the rotatable member 31 is rotated through 90° to the position shown in FIGURE 6. This rotates the cam follower 32 with the result that the longitudinal bias of the spring 11' moves the cross member 10' and hence the cam follower 32 to the left, the cam follower being held in engagement with the cam surface 33 by said spring 11'. Thus the plate member 5' is also moved to the left and the spring 11' acting on the locking member 13' holds this in engagement with the plate member 5' so that the teeth 15' of said locking member 13' are moved out of engagement with the teeth 16' of the locking member 14'. The cross member 10' is now free to pivot with respect to the base structure of the seat, and accordingly the back frame structure can be adjusted in position against or whilst restraining the torsional bias of the coil spring 11'. When the seat has been moved to a desired position the rotatable member 31 is returned to its original position whereupon the cam surface 33 moves the cam follower 32 and hence the cross member 10' and locking member 13' to the right to the locked position shown in FIGURE 4.

In the embodiment of FIGURES 7 to 11 again components which correspond to those present in the previously described embodiments are given the same reference numerals but with the appendix ". In FIGURES 7 and 8 there are shown respectively the left and right ends of a cross member 10" which is a tubular member as in the previously described embodiments. In the drawings depicting the present embodiment the side members of the back frame structure are not shown but these are coupled to respective plate members 4" and 5", and the seat base structure, which is also not shown, is coupled at its left and right hand ends to plate members 6" and 7" respectively.

The embodiment of FIGURES 7 to 11 is in many ways similar in construction to the embodiment of FIGURES 4 to 6 and so only the differences will be described in detail. Thus at the left hand end of cross member 10" (FIGURE 8), said cross member 10" is mounted for rotation with respect to the plate member 6" but is not displaceable lengthwise with respect to said plate member. Thus at the left hand end of cross membmer 10" (FIGURES 7 and 9) the locking member 14" is slidably coupled to the plate member 7" by the provision of splines 37 in said locking member 14" engageable by said plate member 7".

Moreover the coil spring 11" is in this embodiment arranged to bias the cross member 10" torsionally only, and an additional spring 38 is provided in an annular space betwen the two locking members 13" and 14".

The spring 37 is a compression spring, thus tending to urge the teeth of the two locking members 13" and 14" out of engagement with each other. Thus in this embodiment when the rotatable member 31" is pivoted instead of the cam follower 32" being moved longitudinally it is the cam surface 33" which is moved. Hence the locking member 14" moves with respect to the plate member 7" causing the teeth of the locking members 13" and 14" to be engaged or disengaged according to the sense of rotation of the rotatable member 31".

It will be seen in FIGURES 7 and 9 that the locking member 13" is held in engagement with the plate member 5" by the compression spring 38, and not by the torsion spring 11".

The coupling of the spring 11" at its left-hand end is shown in greater detail in FIGURE 10. The end of the spring 11" is bent over and accommodated in diametrically opposite slots 39 in the cup-shaped end plate 35". These slots are arranged to permit rotation of the spring 11" with the cross member 10" when the seat back position is adjusted. The end plate 35" is coupled to the plate member 6" by means of four lugs 40 spaced around the end plate 35" and projecting outwardly therefrom as shown. Four stampings 41 from the plate members 6" are bent outwardly and transversely with respect to said plate member 6" to form four recesses in which the lugs 40 are engaged by rotating the end plate 35". It will be appreciated that a similar arrangement may be employed for securing the left-hand end of the coil spring 11' in the embodiment of FIGURES 4 to 6.

Referring now to FIGURE 12 this shows a preferred locking device for the seat arrangement. The locking device comprises two annular locking structures 113" and 114" correspondingly respectively, to the toothed wheels 13", 14" in FIGURE 7. In other respects the devices are similar and like designations have been used to indicate the similar functions. As in the case of the wheels 13", 14" axial and radial castellations, respectively, such as those indicated at 115 and 116 in the present example, are provided on the structures 113" and 114" to prevent rotation of these structures relative to the seat back frame 5" in the case of structure 113" and the base frame plate 7" in the case of structure 114".

The present embodiment does however include a coiled biasing spring 117 and in addition a coiled biasing 118 acting on the actuator 31" tending to maintain the actuator 31" in its locked position.

The form of the annular structure 113" and 114" is such as to provide on the one hand negligible risk of fracture or shearing of the teeth under heavy circumferential loading and on the other hand a configuration which is relatively cheap to manufacture.

Still further, a larger number of teeth need to be provided if virtually infinite angular adjustment of the seat back relatively to the seat base structure is to be afforded. To these ends the structures 113" and 114" are preferably die cast as from a zinc alloy or they may be formed as sintered iron. The teeth of annular structures 113" and 114" extend in the axial direction along the sides of male and female conical sections. In the case of structure 1 this is formed with an axially projecting flange 119 of conical cross section and having teeth 120 on opposed sides thereof. These teeth 120 in the locked condition of the device mesh with teeth 121 of corresponding teeth provided along the sides of angular groove or channel 122, also of conical configuration, in the structure 114". Thus it will be seen that the toothed parts of structures 113" and 114" afford a double coned locking action so that the circumferential loading on the annuli 113" and 114" is borne by two sets of teeth. To afford some indication of the number of teeth which are provided it may be mentioned that for a mean diameter of the flange 119 of approximately two inches 180 teeth may be provided around each of the conical surfaces.

In order to prevent jamming of the two toothed annular structures the angle of the teeth relatively to the axis of the structures is made between 15° and 18° which is also high enough to prevent the two annuli separating when subjected to purely circumferential force of torque without any axial restraint.

What I claim is:

1. An arrangement for providing angular adjustment of the back frame structure of a seat relatively to a base structure of said seat, comprising means pivotally mounting said back frame structure on said base structure to provide for angular movement of the back frame structure, seat back locking means located on one side only of the seat base structure and comprising two coaxially arranged generally annular toothed locking members one of which is coupled to said base structure and the other of which is coupled to the back frame structure and an actuator rotatable about a generally horizontal axis and located on the same side of the seat base structure as the locking members and including cam means effective when actuated to displace one of said toothed locking members relatively to the other toothed locking member along the pivotal axis of the seat back structure, the arrangement being such that in one position of said cam means the teeth of the two locking members are in engagement with one another to preclude pivotal movement of said seat back structure with respect to said base structure whilst in another position of said cam means the teeth of the two locking members are disengaged from one another to permit said pivotal movement.

2. An arrangement according to claim 1, in which the two toothed locking members have inter-engageable male and female parts of conical configuration with generally axially extending teeth, the angle of inclination of which to the axis of the locking members in any axial plane thereof being greater than the jamming angle but less than the angle at which the locking members separate under purely circumferential loading.

3. An arrangement according to claim 2, in which the two locking members afford a double cone toothed locking arrangement.

4. An arrangement according to claim 1 in which spring means are provided biasing said back frame structure forwardly with respect to the base structure of the seat.

5. An arrangement according to claim 1, in which spring means are provided biasing said toothed locking members to their disengaged position.

6. An arrangement according to claim 1, including a cross member defining said seat back structure pivotable axis and fixedly attached to said back frame structure, said actuator including a rotatable member pivotally mounted on said cross member and coupled to said one other toothed locking member, the arrangement being such that on pivoting said rotatable member, said cam means causes said rotatable member to be displaced in the lengthwise direction of said cross member, whereby said other toothed member is likewise displaced.

7. An arrangement according to claim 6, in which said cam means comprises a cam surface and a cam follower, one of which is coupled to said rotatable member and the other of which is formed integrally with the toothed locking member coupled to said base structure.

8. An arrangement according to claim 7, in which said cam surface is formed integrally with said rotatable member and said cam follower comprises a projection in a boss of said toothed locking member coupled to said base structure.

9. An arrangement according to claim 7, in which said cam surface is formed integrally with said toothed locking member coupled to said base structure and said cam follower is coupled to said rotatable member.

10. An arrangement according to claim 6, in which the actuator is spring biased to a normal or rest position.

11. An arrangement according to claim 1, including a cross member defining said seat back structure pivotable axis, said cross member being slidably coupled to said base structure and said actuator being effective to slide said cross member relatively to said base structure, said two toothed locking members being respectively fixedly coupled to said cross member and said base structure.

12. An arrangement according to claim 11, in which a coil spring is employed biasing said back frame structure forwardly with respect to said base structure and also biasing said cross member longitudinally towards a position in which said teeth are disengaged from one another.

13. An arrangement according to claim 12, in which said cross member is a tubular member and said coil spring is provided surrounding or within said tubular cross member.

14. An arrangement according to claim 11, in which said cross member is coupled to said actuator via a bowed spring plate rotatably coupled to said actuator and disposed within said cross member which plate is partially flattened forcibly to cause its periphery to bite into the material of said cross member.

15. An arrangement according to claim 11, in which said cross member is coupled to said actuator via an annular flange projecting outwardly at the end of said cross member.

16. An arrangement according to claim 1, including a cross member defining said seat back structure pivotable axis, said cross member being fixedly coupled to said base structure in its lengthwise direction and the toothed locking member coupled to said base structure being slidably coupled thereto whereby said actuator is effective to slide said toothed locking member coupled to said base structure relatively to said base structure and said cross member.

17. An arrangement according to claim 16, in which spring means are provided between said toothed locking members biasing them to the disengaged position.

18. An arrangement according to claim 17, in which said cross member is a tubular member and a coil spring is provided surrounding or within said tubular cross member biasing said back frame structure forwardly with respect to said base structure.

References Cited

UNITED STATES PATENTS

| 1,856,534 | 5/1932 | Boery | 297—373 |
| 3,051,526 | 8/1962 | Werner et al. | 297—367 |
| 3,099,485 | 7/1963 | Beierbach et al. | 297—373 |
| 3,271,811 | 10/1966 | Flodell | 16—140 |
| 3,362,747 | 1/1968 | Fuelling et at. | 297—373 |
| 3,401,979 | 9/1968 | Putsch | 297—362 |

FOREIGN PATENTS

| 1,244,382 | 9/1960 | France. |
| 258,137 | 2/1967 | Austria. |
| 1,239,201 | 4/1967 | Germany. |
| 1,104,213 | 2/1968 | Great Britain. |

BOBBY R. GAY, Primary Examiner

G. O. FINCH, Assistant Examiner